US010074041B2

(12) United States Patent
Zhou et al.

(10) Patent No.: US 10,074,041 B2
(45) Date of Patent: Sep. 11, 2018

(54) FINE-GRAINED IMAGE CLASSIFICATION BY EXPLORING BIPARTITE-GRAPH LABELS (71) Applicant: NEC Laboratories America, Inc., Princeton, NJ (US)

(72) Inventors: Feng Zhou, Sunnyvale, CA (US); Yuanqing Lin, Sunnyvale, CA (US)

(73) Assignee: NEC Corporation (JP)

( * ) Notice: Subject to any disclaimer, the term of this patent is extended or adjusted under 35 U.S.C. 154(b) by 198 days.

(21) Appl. No.: 15/095,260

(22) Filed: Apr. 11, 2016

(65) Prior Publication Data
US 2016/0307072 A1  Oct. 20, 2016

Related U.S. Application Data

(60) Provisional application No. 62/251,425, filed on Nov. 5, 2015, provisional application No. 62/148,788, filed on Apr. 17, 2015.

(51) Int. Cl.
| | | |
|---|---|---|
| G06K 9/62 | (2006.01) |
| G06K 9/66 | (2006.01) |
| G06T 7/00 | (2017.01) |
| G06N 3/08 | (2006.01) |
| G06K 9/46 | (2006.01) |

(52) U.S. Cl.
CPC .......... *G06K 9/66* (2013.01); *G06K 9/469* (2013.01); *G06K 9/627* (2013.01); *G06K 9/6267* (2013.01); *G06N 3/084* (2013.01); *G06T 7/0004* (2013.01); *G06T 2207/30128* (2013.01)

(58) Field of Classification Search
None
See application file for complete search history.

(56) References Cited

U.S. PATENT DOCUMENTS

| | | | |
|---|---|---|---|
| 2015/0228062 A1* | 8/2015 | Joshi | G06Q 50/12 382/110 |
| 2016/0093290 A1* | 3/2016 | Lainez | G10L 15/005 704/232 |

OTHER PUBLICATIONS

Srivastava, Nitish, and Ruslan R. Salakhutdinov. "Discriminative transfer learning with tree-based priors." In Advances in Neural Information Processing Systems, pp. 2094-2102. 2013.*

* cited by examiner

*Primary Examiner* — Sumati Lefkowitz
*Assistant Examiner* — David Perlman
(74) *Attorney, Agent, or Firm* — Joseph Kolodka (57) ABSTRACT

Systems and methods are disclosed for deep learning and classifying images of objects by receiving images of objects for training or classification of the objects; producing fine-grained labels of the objects; providing object images to a multi-class convolutional neural network (CNN) having a softmax layer and a final fully connected layer to explicitly model bipartite-graph labels (BGLs); and optimizing the CNN with global back-propagation.

19 Claims, 6 Drawing Sheets

FINE-GRAINED IMAGE CLASSIFICATION BY EXPLORING BIPARTITE-GRAPH LABELS

This application claims priority to Provisional Application 62/251,425 filed Nov. 5, 2015 and 62/148,788 filed Apr. 17, 2015, the content of which is incorporated by reference.

BACKGROUND

The present system relates to fine-grained image classification of real-world physical objects.

Recognition of objects from real-world images is an important task that has many applications, including smart car, security, learning associated with physical structures and products, among others. Fine-grained image classification needs to discern subtle differences among similar classes. The majority of existing approaches have thus been focusing on localizing and describing discriminative object parts in fine-grained domains. Various pose-normalization pooling strategies combined with 2D or 3D geometry have been preferred for recognizing birds. The main drawback of these approaches is that part annotations are significantly more challenging to collect than image labels. Instead, a variety of methods have been developed towards the goal of finding object parts in an unsupervised or semi-supervised fashion.

To provide good features for recognition, another prominent direction is to adopt detection and segmentation methods as an initial step and to filter out noise and clutter in background. However, better feature through segmentation always comes with computational cost as segmentation is often computationally expensive.

While most existing works focus on single-label classification problem, it is more natural to describe real world images with multiple labels like tags or attributes. According to the assumptions on label structures, previous work on structural label learning can be roughly categorized as learning binary, relative or hierarchical attributes.

Much prior work focuses on learning binary attributes that indicate the presence of a certain property in an image or not. For instance, previous works have shown the benefit of learning binary attributes for face verification, texture recognition, clothing searching, and zero-shot learning. However, binary attributes are restrictive when the description of certain object property is continuous or ambiguous.

To address the limitation of binary attributes, comparing attributes has gained attention in the last years. The relative-attribute approach learns a global linear ranking function for each attribute, offering a semantically richer way to describe and compare objects. While a promising direction, a global ranking of attributes tends to fail when facing fine-grained visual comparisons. One existing system provides learning local functions that tailor the comparisons to neighborhood statistics of the data. A Bayesian strategy can infer when images are indistinguishable for a given attribute.

SUMMARY

In one aspect, systems and methods are disclosed for deep learning and classifying images of objects by receiving images of objects for training or classification of the objects; producing fine-grained labels of the objects; providing object images to a multi-class convolutional neural network (CNN) having a softmax layer and a final fully connected layer to explicitly model bipartite-graph labels (BGLs); and optimizing the CNN with global back-propagation.

Advantages of the system may include one or more of the following. The method achieved state-of-the-arts accuracy in many benchmark dataset. The method is efficient enough to handle very large-scale dataset. The key difference is the use of the bipartite structure of labels. Three benefits follow: (1) it leverages the inherent sub-structure among labels to learn a more accurate model; (2) it regularizes the learning process to alleviate the overfitting problem in CNN; and (3) it is computationally efficient in inference thanks to the bipartite structure. In various tests, the system can predict the instance-level sub-ordinate categories of cars (eg., Honda Accord 2012) and food (Mapo Tofu made by a particular restaurant) from real-world images, which are even difficult to recognize for humans. Focusing on different goal on exploring label structures, our method can be potentially combined with other methods to further improve the performance.

DESCRIPTION

Figure 1:
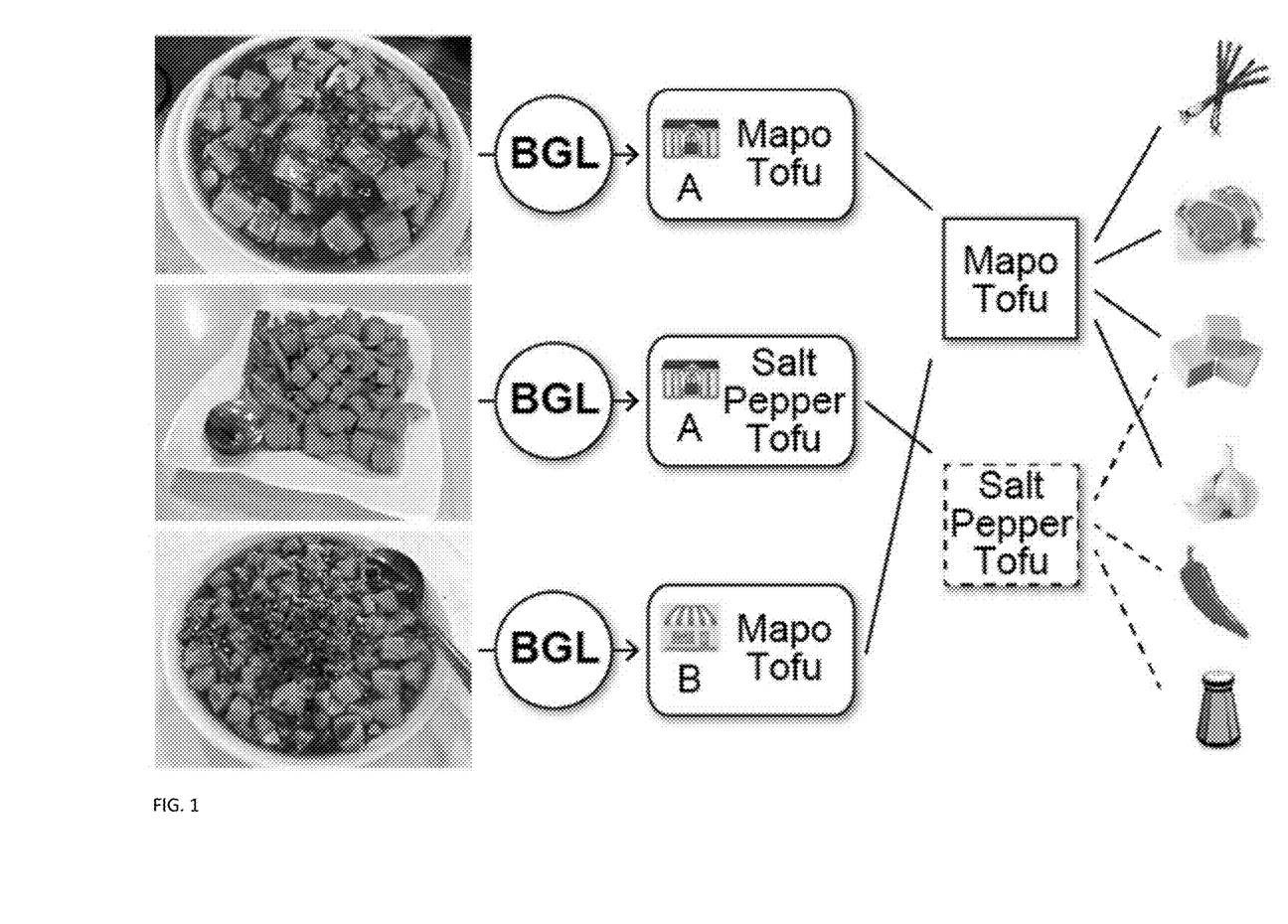
FIG. 1 illustrates three ultra-fine grained classes.

FIG. 1. Illustration of three ultra-fine grained classes (middle), Mapo Tofu of Restaurant A, Salt Pepper Tofu of Restaurant B, and Mapo Tofu of Restaurant B. Their relationships can be modeled through three bipartite graphs, fine-grained classes vs. general food dishes (left) and fine-grained classes vs. two ingredients (right). The system incorporates the rich bipartite-graph labels (BGL) into convolutional neural network training to improve recognition accuracy. The preferred BGL method is used in a common multi-class convolutional neural network (CNN) framework, which is compatible to most popular architectures such as AlexNet, GoogLeNet and VGGNet. The approach modifies their softmax layer as well as the last fully connected layer to explicitly model BGLs. The resulted CNN is optimized by a global back-propagation.

In the following, bold capital letters denote a matrix X, bold lower-case letters a column vector x. All non-bold letters represent scalars. $x_i$ represents the $i^{th}$ column of the matrix X. $x_{ij}$ denotes the scalar in the $i^{th}$ row and $j^{th}$ column of the matrix X. $1_{[i=j]}$ is an indicator function and its value equals to 1 if i=j and 0 otherwise. The system receives a set of n images X={(x, y),Λ} for training, where each image x is annotated with one of k fine-grained labels, y=1,Λ,k. In one embodiment, $x \in R^d$ denotes the input feature of the last fully-connected layer, which generates k scores $f \in R^k$ through a linear function $f=W^T x$ defined by the parameters $W \in R^{d \times k}$. In a nutshell, the last layer of CNN is to minimize the negative log-likelihood over the training data, $$\min_W \sum_{(x,y)\in \chi} -\log P(y \mid x, W), \quad (1)$$

where the softmax score, $$P(i \mid x, W) = \frac{e^{f_i}}{\sum_{j=1}^{k} e^{f_j}} \doteq p_i, \quad (2)$$

encodes the posterior probability of image being classified as the fine-grained class.

Despite the great improvements achieved on base-class recognition in the last few years, recognizing object classes in ultra-fine granularity like the example shown in FIG. 1 is still challenging mainly for two reasons. First, unlike general recognition task, the amount of labels with ultra-fine granularity is often limited. The training of a high-capacity CNN model is thus more prone to overfitting. Second, it is difficult to learn discriminative features to differentiate between similar fine-grained classes in the presence of large within-class difference.

To address these issues, we use bipartite-graph labels (BGL) to jointly model the fine-grained classes with predefined coarse classes. Generally speaking, the choices of coarse classes can be any grouping of fine-grained classes. Typical examples include bigger classes, attributes or tags. For instance, FIG. 1 shows three types of coarse classes defined on the fine-grained Tofu dishes (middle). In the first case (Graph 1 in FIG. 1), the coarse classes are two general Tofu food classes by neglecting the restaurant tags. In the second and third cases (Graph 2 and 3 in FIG. 1), the coarse classes are binary attributes according to the presence of some ingredient in the dishes. Compared to the original softmax loss (Eq. 3.1) defined only on fine-grained labels, the introduction of coarse classes in BGL has three benefits: (1) New coarse classes bring in additional supervised information so that the fine-grained classes connected to the same coarse class can share training data with each other. (2) All fine-grained classes are implicitly ranked according to the connection with coarse classes. For instance, Toyota Camry 2014 and Toyota Camry 2015 are much closer to each other compared to Honda Accord 2015. This hierarchical ranking guides CNN training to learn more discriminative features to capture subtle difference between fine-grained classes. (3) Compared to image-level labels (, image attribute, bounding box, segmentation mask) that are expensive to obtain, it is relatively cheaper and more natural to define coarse classes over fine-grained labels. This fact endows BGL the board applicability in real scenario.

Given m types of coarse classes, where each type j contains $k_j$ coarse classes, BGL models their relations with the k fine-grained classes as m bipartite graphs grouped in a star-like structure. Take FIG. 1 for instance, where the three types of coarse classes form three separated bipartite graphs with the fine-grained Tofu dishes, and there is no direct connection among the three types of coarse classes. For each graph of coarse type j, we encode its bipartite structure in a binary association matrix $G_j \in \{0,1\}^{k \times k_j}$, whose element $g_{ic_j}^{j}=1$ if the $i^{th}$ fine-grained label is connected with coarse label $c_j$. As it will become clear later, this star-like composition of bipartite graphs enables BGL to perform exact inference as opposed to the use of other general label graphs.

To generate the scores $f_j = W^T x \in R^{k_j}$ for coarse classes of type j, we augment the last fully-connected layer with m additional variables, $\{W_j\}_j$, where $W_j \in R^{d \times k_j}$. Given an input image x of $i^{th}$ fine-gained class, BGL models its joint probability with any m coarse labels $\{c_j\}_j$ as, $$P(i, \{c_j\}_j \mid x, W, \{W_j\}_j) = \frac{1}{z} e^{f_i} \prod_{j=1}^{m} g_{ic_j}^{j} e^{f_{c_j}^{j}},$$

where z is the partition function computed as:

$$z = \sum_{i=1}^{k} e^{f_i} \prod_{j=1}^{m} \sum_{c_j=1}^{k_j} g_{ic_j}^{j} e^{f_{c_j}^{j}}.$$

At first glance, computing z is infeasible in practice. Because of the bipartite structure of the label graph, however, we could denote the non-zero element in $i^{th}$ row of $G_j$ as $\phi_i^j = c_j$ where $g_{ic_j}^{j}=1$. With this auxiliary function, the computation of z can be simplified as $$z = \sum_{i=1}^{k} e^{f_i} \prod_{j=1}^{m} e^{f_{\phi_i^j}^{j}}. \quad (3)$$

Given z, the marginal posterior probability over fine-grained and coarse labels can be computed as:

$$P(i \mid x, W, \{W_j\}_j) = \frac{1}{z} e^{f_i} \prod_{j=1}^{m} e^{f_{\phi_i^j}^{j}} \doteq p_i,$$

$$P(c_j \mid x, W, \{W_l\}_l) = \frac{1}{z} \sum_{i=1}^{k} g_{ic_j}^{j} e^{f_i} \prod_{l=1}^{m} e^{f_{\phi_i^l}^{l}} \doteq p_{c_j}^{j}.$$

As discussed before, one of the difficulties in training CNN is the possibility of being overfitting. One common solution is to add a $l_2$ weight decay term, which is equivalent to sample the columns of W from a Gaussian prior. Given the connection among fine-grained and coarse classes, BGL provides another natural hierarchical prior for sampling the weights:

$$P(W, \{W_j\}_j) = \prod_{i=1}^{k} \prod_{j=1}^{m} \prod_{c_j=1}^{k_j} e^{-\frac{\lambda}{2} g_{ic_j}^{j} \|w_i - w_{c_j}^{j}\|^2} \doteq p_w.$$

This prior expects $w_i$ and $w_{c_j}^{j}$ have small distance if $i^{th}$ fine-grained label is connected to coarse class $c_j$ of type j. BGL can handle general coarse labels such as multiple attributes.

In summary, given the training data X and the graph label defined by $\{G_j\}_j$, the last layer of CNN with BGL aims to minimize the joint negative log-likelihood with proper regularization over the weights:

$$\min_{W, \{W_j\}_j} \sum_{(x,y)\in\chi} \left( -\log p_y - \sum_{j=1}^{m} \log p_{\phi_y^j}^j \right) - \log p_w. \quad (4)$$

Figure 2A:
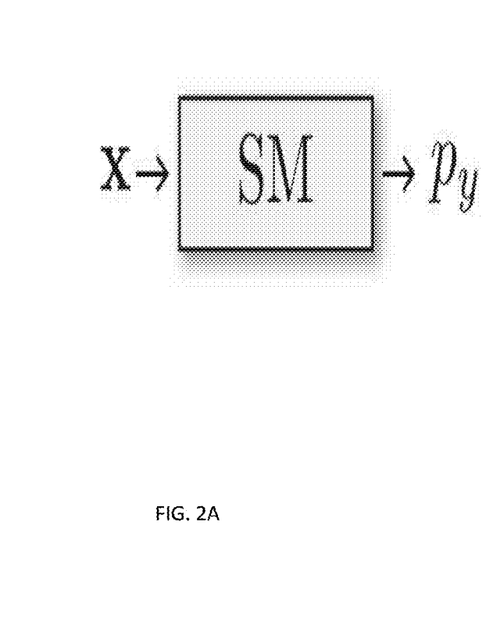
FIGS. 2A-2C shows exemplary comparison of output layers, with FIG. 2A showing Softmax (SM), FIG. 2B showing a BGL with one feature (BGL1) and FIG. 2C showing a BGL with multiple features (BGLm).
Figure 2B:
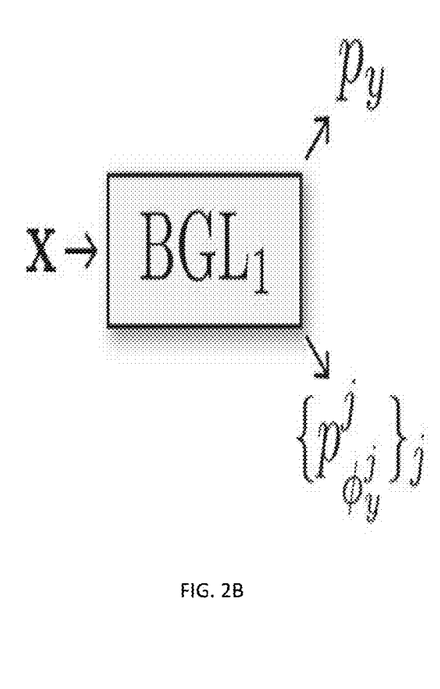
Figure 2C:
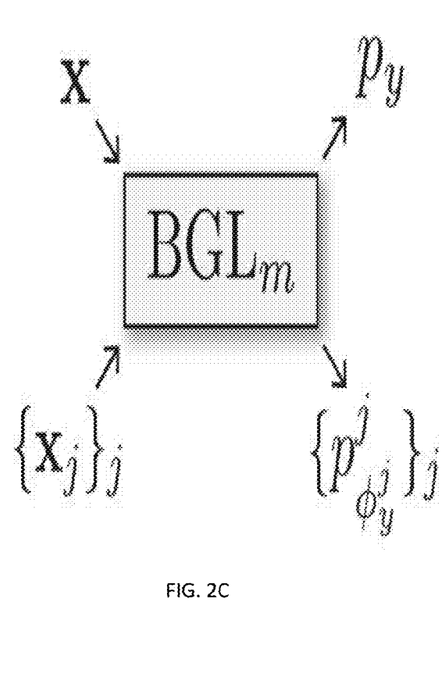

FIG. 2a-2c shows various exemplary comparison of output layers: (a) Softmax (SM), (b) BGL with one feature (BGL), and (c) BGL with multiple features (BGL). In one implementation, we optimized BGL using the standard back-propagation with mini-batch stochastic gradient descent. The gradients for each parameter can be computed all in closed-form:

$$\frac{\partial \log p_y}{\partial f_i} = 1_{[i=y]} - p_i, \quad \frac{\partial \log p_y}{\partial f_{c_j}^j} = 1_{[g_{yc_j}^j=1]} - p_{c_j}^j,$$

$$\frac{\partial \log p_{\phi_y^j}^j}{\partial f_i} = \frac{p_i}{p_{\phi_y^j}^j} 1_{[g_{i\phi_y^j}^j=1]} - p_i, \quad \frac{\partial \log p_{\phi_y^j}^j}{\partial f_{c_j}^j} = 1_{[c_j=\phi_y^j]} - p_{c_j}^j,$$

$$\frac{\partial \log p_{\phi_y^j}^j}{\partial f_{c_l}^l} = \sum_{i=1}^{k} g_{i\phi_y^j}^j g_{il}^l \frac{p_i}{p_{\phi_y^j}^j} - p_{c_l}^l, \quad l \neq j, \quad (5)$$

$$\frac{\partial \log p_w}{\partial w_i} = -\lambda \sum_{j=1}^{m} \sum_{c_j=1}^{k_j} g_{ic_j}^j (w_i - w_{c_j}^j), \quad (6)$$

$$\frac{\partial \log p_w}{\partial w_{c_j}^j} = -\lambda \sum_{i=1}^{k} g_{ic_j}^j (w_{c_j}^j - w_i). \quad (7)$$

The system implements the following in one implementation: (1) Computing $$p_i / p_{\phi_y^j}^j$$

by independently calculating $p_i$ and $$p_{\phi_y^j}^j$$

is not numerically stable because $$p_{\phi_y^j}^j$$

could be very small. It is better to jointly normalize the two terms first. (2) Directly computing Eq. 3.3 has a quadratic complexity with respect to the number of coarse classes. But it can be reduced to linear because most computations are redundant. (3) we assume the same feature x is used for computing both the fine-grained $f=W^T x$ and coarse scores $f_j=W_j^T x$. In fact, BGL can naturally combine multiple CNNs as shown in FIG. 2c. This allows the model to learn different low-level features $X_j$ for coarse labels $f_j=W_j^T x_j$.

Figure 3:
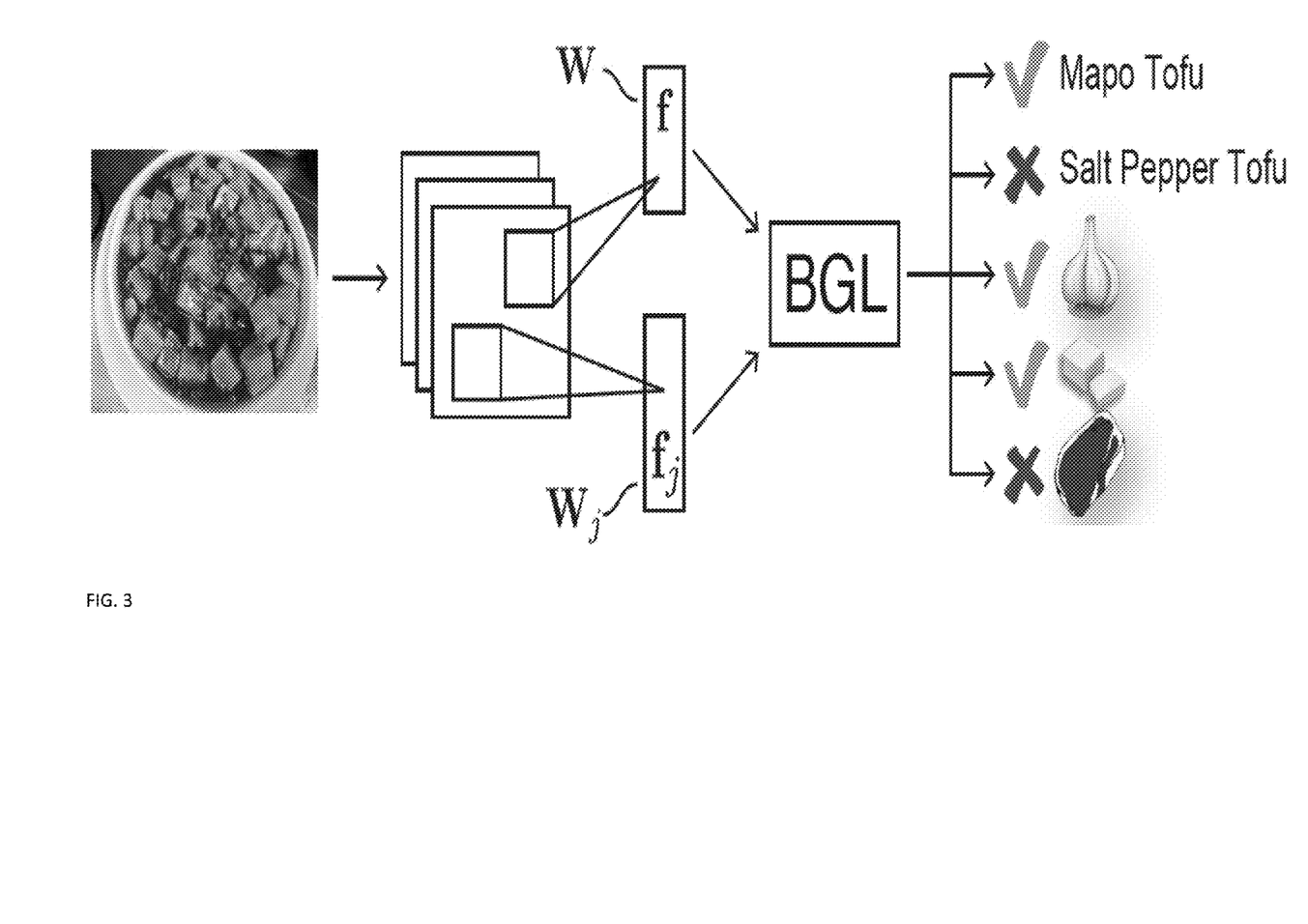
FIG. 3 shows an exemplary system for detecting food from a particular restaurant source.

FIG. 3 shows an exemplary system for detecting food from a particular restaurant source. The system is well suited for deep learning and classifying images of objects by receiving images of objects for training or classification of the objects; producing fine-grained labels of the objects; providing object images to a multi-class convolutional neural network (CNN) having a softmax layer and a last fully connected layer to explicitly model bipartite-graph labels (BGLs); and optimizing the CNN with global back-propagation. In one embodiment, the system includes generating bipartite-graph labels for fine-grained object recognition in the CNNs and modeling a bi-partite graph structure in a conditional random fields (CRF) and optimizing low-level features and high-level connections in the CNN.

Figure 4:
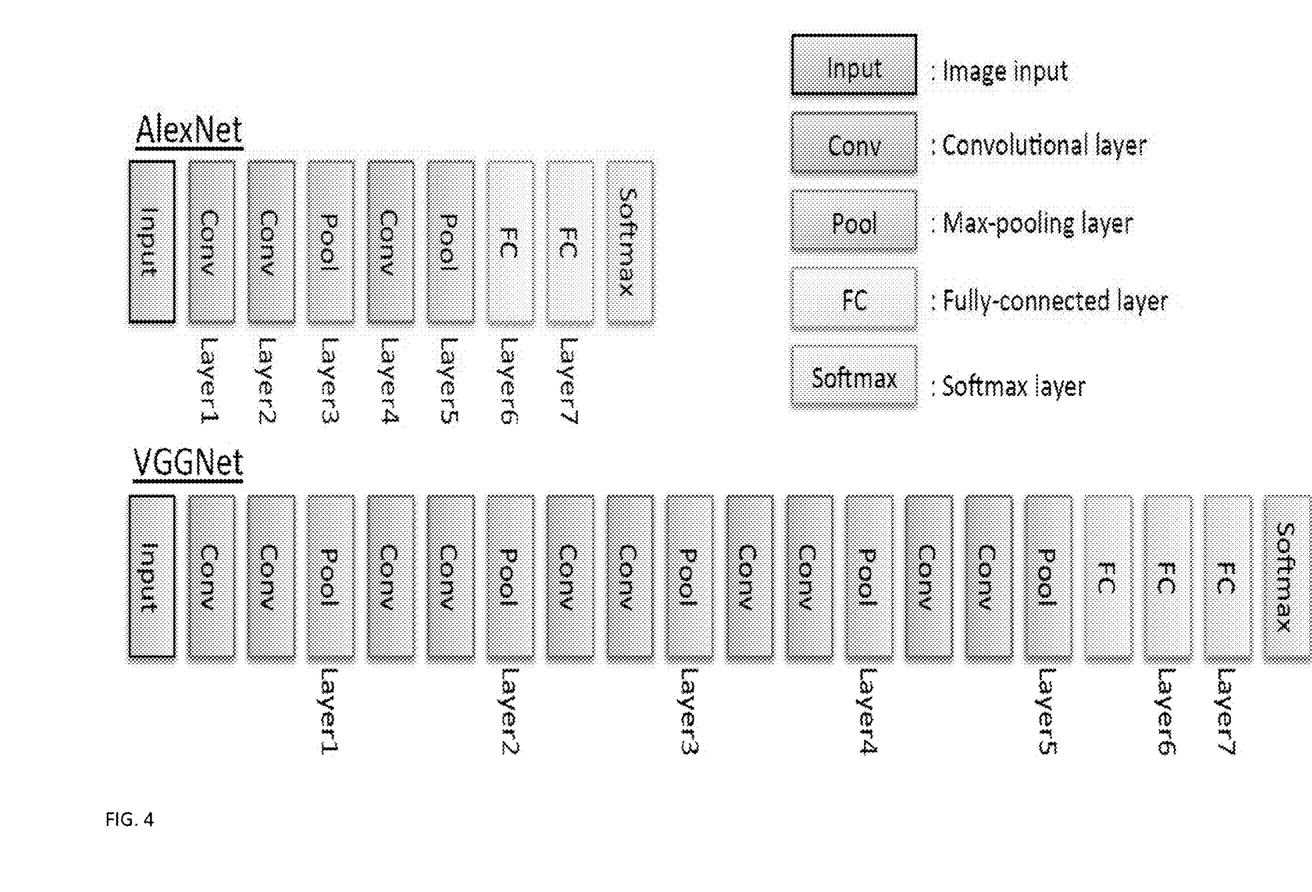
FIG. 4 shows exemplary CNNs with the bipartite-graph labels.

FIG. 4 shows one implementation of BGL with the off-the-shelf Caffe platform. The system is then tested on three popular CNN frameworks, AlexNet (AN), GoogLeNet (GN), and VGGNet (VGG). For each of them, we compared three settings: SM with the traditional softmax loss; $BGL_1$ by modifying the softmax layer and the last fully connected layer as the preferred BGL approach; and $BGL_m$ by combining multiple networks that generate different features for fine-grained and coarse classes.

In sum, the preferred BGL exploits the rich class relationships in the very challenging ultra-fine grained tasks. BGL improves the traditional softmax loss by jointly modeling fine-grained and coarse labels through bipartite-graph labels. The use of a special bipartite structure enables BGL to be efficient in inference. We also contribute Food-975, an ultra-fine grained food recognition benchmark dataset. We show that the preferred BGL approach improves over previous work on a variety of datasets.

Our models were trained for 100 epochs on a single NVIDIA K40 GPU. We adopted the default hyper-parameters as used by Caffe. In all experiments, we fine-tuned from pre-trained ImageNet model. During training, we down-sampled the images to a fixed 256-by-256 resolution, from which we randomly cropped 224-by-224 patches for training. We also did their horizontal reflection for further data augmentation. During testing, we evaluated the top-1 accuracy using two cropping strategies: (1) single-view (SV) by cropping the center 224-by-224 patch of the testing image, and (2) multi-view (MV) by averaging the center, 4 corners and their mirrored versions. In the first three datasets, we evaluated our methods using two protocols, without (w/o. BBox) and with (w/. BBox) the use of ground-truth bounding box to crop out the object both at training and testing.

The first experiment validates our approach on the Stanford car dataset, which contains 16,185 images of 196 car categories. We adopted a 50-50 split by dividing the data into 8,144 images for training and the rest for testing. Each category is typically at the level of maker, model and year, Audi A5 Coupe 12. We manually assigned each fine-grained label to one of 9 coarse body types. Our method of VGG-$BGL_m$ beats all previous works except one which leveraged the part information in an unsupervised way. BGL has the advantage of predicting coarse label. For instance, GN-$BGL_m$ achieved 95.7% in predicting the type of a car image.

In the second experiment, we tested our method on CUB-200-2011, which is generally considered the most competitive dataset within fine-grained recognition. CUB-200-2011 contains 11,788 images of 200 bird species. We used the provided train/test split and reported results in terms of classification accuracy. To get the label hierarchy, we adopted the annotated 312 visual attributes associated with the dataset. These attributes are divided into 28 groups, each of which has about 10 choices. According to the provided confidence score, we assigned each attribute group with the most confident choice for each bird specie. From the experiments, we observed using BGL modules can consistently improved AN-SM, GN-SM and VGG-SM.

Without any pose alignment steps, our method GN-BGL$_m$ obtained 76.9% without the use of bounding box, improving the recent part-based method by 3%. In addition, GN-BGL$_m$ achieved 89.3% and 93.3% accuracy on predicting attributes of wing color and shape. However, our method still performed worse than the latest methods which show the significant advantage by exploring part information for bird recognition. BGL improves the last fully connected and loss layer for attribute learning, while the other systems focus on integrating object part information into convolutional layers. Therefore, it is possible to combine these two orthogonal efforts to further improve the overall performance.

In the third experiment, we test our method on the Car-333 dataset, which contains 157,023 training images and 7,840 testing images. Compared to the Stanford car dataset, the images in Car-333 were end-user photos and thus more naturally photographed. Each of the 333 labels is composed by maker, model and year range. Two cars of the same model but manufactured in different year ranges are considered different classes. To test BGL, we generated two sets of coarse labels: 10 "type" coarse labels manually defined according to the geometric shape of each car model and 140 model coarse labels by aggregating year range labels. The bounding box of each image was generated by Regionlets, the state-of-the-art object detection method.

We tested BGL with three combinations of the coarse labels: using either model or type, and using model and type jointly. In particular, BGL gains much more improvements using the 140 model coarse labels than the 10 type labels. This is because the images of the cars of the same "model" are more similar than the ones in the same "type" and it defines richer relationships among fine-grained classes. Nevertheless, BGL can still get benefit from putting the "type" labels on top of the "model" labels to form a three-level label hierarchy. Finally, GN-BGL$_m$ significantly improved the performance of GN-SM from 79.8% to 86.4% without the use of bounding box. For more result on AN and VGG, please refer to the supplementary material.

Compared to GN-SM, GN-BGL needs only very little additional computation to perform exact inference in the loss function layer. This demonstrates the efficiency of modeling label dependency in a bipartite graphs. For the last fully connected (FC) layer, BGL performs exactly the same computation as GN in the forward passing, but needs additional cost for updating the gradient (Eq. 3.3 and Eq. 3.3) in the backward passing. Because both the loss and last FC layers take a very small portion of the whole pipeline, we found the total time difference between BGL and GN was minor.

Figures 5A, 5B:
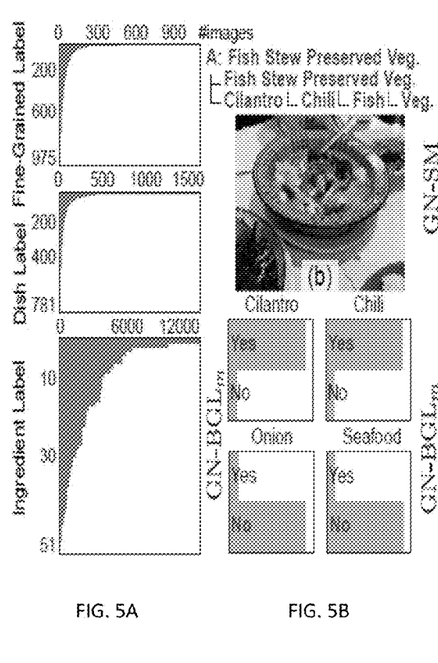
FIG. 5A-5F show exemplary comparisons for the preferred BGL system with different baselines.
Figure 5C:
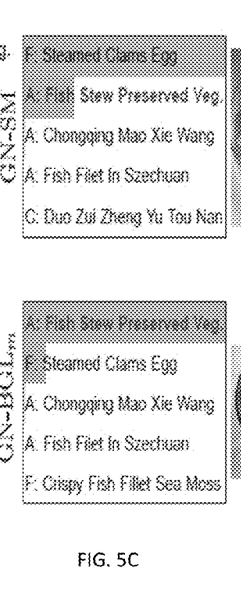
Figures 5D, 5E, 5F:
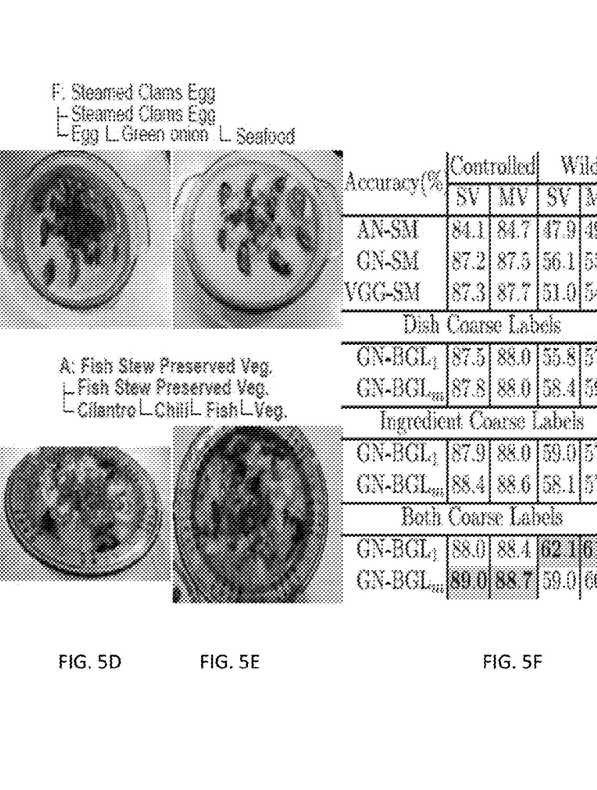

FIGS. 5A-5F shows an exemplary performance illustration on the Food-975 dataset. FIG. 5A shows exemplary distribution of training images for each fine-grained (top), dish (middle), and ingredient (bottom) category. FIG. 5B shows exemplary testing image. FIG. 5C shows exemplary ingredients predicted by GN-BGL$_m$. FIG. 5D shows exemplary top-5 predictions generated by GN-SM (top) and the preferred GN-BGL$_m$ (bottom) respectively. FIG. 5E shows similar training exemplars according to the input feature x. FIG. 5F illustrates the accuracy of the food recognition Given a food image from a restaurant, the system can answer the question "which restaurant which dish"? This is an ultra-fine grained image recognition problem and is very challenging. Such ultra-fine granularity brings along rich relationships among the classes. In particular, different restaurants may cook similar dishes with different ingredients.

We collected a high quality food dataset. We sent 6 data collectors to 6 restaurants. Each data collector was in charge of one restaurant and took the photo of almost every dish the restaurant had cooked during a period of 1-2 months. Finally, we captured 32135 high-resolution food photos of 975 menu items from the 6 restaurants for training. We evaluated our method in two settings. To test in a controlled setting, we took additional 4951 photos in different days. To mimic a realistic scenario in the wild, we downloaded 351 images from yelp.com posted by consumers visiting the same restaurants. To model the class relationship, we created a three-level hierarchy. In the first level, we have the 975 fine-grained labels; in the middle, we created 781 different dishes by aggregating restaurant tags; at last, we came up a detailed list of 51 ingredient attributes that precisely describes the food composition.

Given a food image, can a fine-grained object recognition engine tell 'which restaurant which dish" the food belongs to? Such ultra-fine grained image recognition is the key for many applications like search by images, but it is very challenging because it needs to discern subtle difference between classes while dealing with the scarcity of training data. Fortunately, the ultra-fine granularity naturally brings rich relationships among object classes. The system exploits the rich relationships through bipartite-graph labels (BGL). BGL is modeled in an overall convolutional neural networks and the resulting system can be optimized through back-propagation. The system is computationally efficient in inference thanks to the bipartite structure. To facilitate the study, we construct a new food benchmark dataset, which consists of 37,885 food images collected from 6 restaurants and totally 975 menus. Experimental results on this new food and three other datasets demonstrates BGL advances previous works in fine-grained object recognition. FIG. 5A-5F compared the preferred BGL approach with different baselines. FIG. 5E compares our method with AN-SM, GN-SM and VGG-SM in both the controlled and wild settings. BGL approach consistently out-performed AN and GN in both settings. This indicates the effectiveness of exploring the label dependency in ultra-fine grained food recognition. Interestingly, by using both the dish and ingredient labels, BGL can gain a much larger improvement than only using one of them. This implies the connections between the dish labels and the ingredient labels have very useful information. Overall, by exploring the label dependency, the preferred BGL approach consistently achieved 6-8% improvement from GN baseline at different training setups.

For the ultra-fine grained image recognition, the system can handle many more classes. For example, we are constructing a large food dataset from thousands of restaurants where the number of ultra-fine grained food classes can grow into hundreds of thousands. We believe that the research in this direction, ultra-fine-grained image recognition (recognizing images almost on instance-level), holds the key for using images as a media to retrieve information, which is often called search by image. The label structure can be manually defined or can be learned during training. While discrete labels in BGL are discussed, the system can work with continuous labels (for example, regression or ranking). Instead of operating only at class level, we can generalize BGL to deal with image-level labels. This can make the performance of BGL more robust in the case when the attribute label is ambiguous for fine-grained class.

Figure 6:
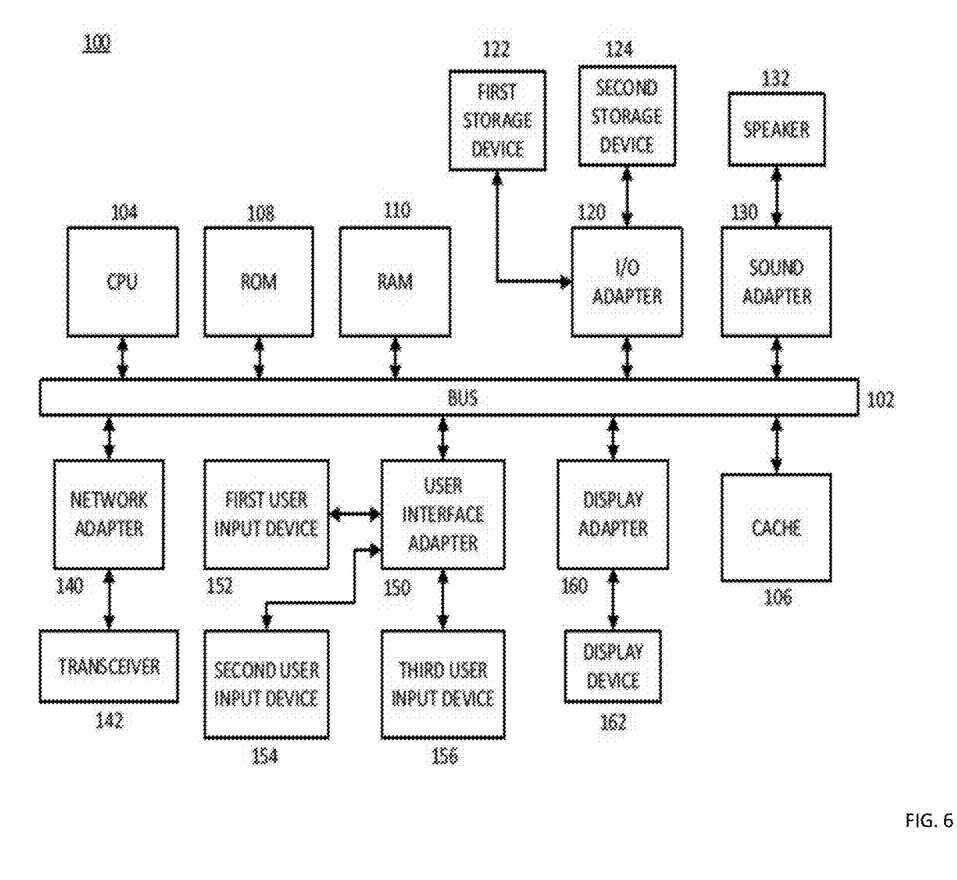
FIG. 6 shows an exemplary system to run the CNNs with the bipartite-graph labels.

FIG. 6 with an exemplary processing system 100, to which the present principles may be applied, is illustratively depicted in accordance with an embodiment of the present principles, for deep learning and classifying images of objects by receiving images of objects for training or classification of the objects; producing fine-grained labels of the objects; providing object images to a multi-class convolutional neural network (CNN) having a softmax layer and a final fully connected layer to explicitly model bipartite-graph labels (BGLs); and optimizing the CNN with global back-propagation.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

While the machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims.

What is claimed is:

1. A method for deep learning and classifying images of objects, comprising:
receiving a set of training images of objects;
producing k fine-grained labels of the objects;
providing the labeled set of training images to a multi-class convolutional neural network (CNN) having a softmax layer and a final fully connected layer to explicitly model bipartite-graph labels (BGLs), and for m types of coarse classes, where each coarse type j (for j=1, . . . , m) contains $k_j$ coarse classes, modeling BGL relations of the k fine-grained classes with the coarse classes as m bipartite graphs grouped in a star-like structure;
optimizing the CNN with global back-propagation; and
classifying input images of objects into fined-grained classes using the optimized CNN.

2. The method of claim 1, comprising modeling a relation between the fine-grained labels and attributes in a hierarchical manner.

3. The method of claim 1, comprising applying the BGLs to jointly model fine-grained classes with predefined coarse classes.

4. The method of claim 3, comprising grouping fine-grained classes as a coarse class.

5. The method of claim 1, for each graph of coarse type j, comprising encoding a bipartite structure in a binary association matrix $G_j \in \{0,1\}^{k \times k_j}$, whose element $g_{ic_j}^{\ j}=1$ if the i-th fine-grained label is connected with coarse label $c_j$.

6. The method of claim 1, comprising:
generating scores $f=W^T x \in \mathbb{R}^k$ for k fine-grained classes;
generating scores $f_j = W_j^T x \in \mathbb{R}^{k_j}$ for $k_j$ coarse classes of type j;
augmenting a last fully-connected layer W with m additional variables, $\{W_j\}_{j=1}^m$ and
with an input image x of i-th fine-gained class, modeling a BGL joint probability with m coarse labels $\{c_j\}_{j=1}^m$ as, $$P(i, \{c_j\}_j \mid x, W, \{W_j\}_j) = \frac{1}{z} e^{f_i} \prod_{j=1}^m g_{ic_j}^j e^{f_{c_j}^j}$$

where the z is the partition function computed as, $$z = \sum_{i=1}^k e^{f_i} \prod_{j=1}^m \sum_{c_j=1}^{k_j} g_{ic_j}^j e^{f_{c_j}^j}.$$

7. The method of claim 1, comprising optimizing the BGL using back-propagation with mini-batch stochastic gradient descent.

8. The method of claim 7, comprising determining gradients for each parameter in closed-form.

9. The method of claim 8, comprising determining the gradients as:

$$\frac{\partial \log p_y}{\partial f_i} = 1_{[i=y]} - p_i, \quad \frac{\partial \log p_y}{\partial f_{c_j}^j} = 1_{[g_{yc_j}^j = 1]} - p_{c_j}^j,$$

$$\frac{\partial \log p_{\phi_y^j}^j}{\partial f_i} = \frac{p_i}{p_{\phi_y^j}^j} 1_{[g_{i\phi_y^j}^j = 1]} - p_i, \quad \frac{\partial \log p_{\phi_y^j}^j}{\partial f_{c_j}^j} = 1_{[c_j = \phi_y^j]} - p_{c_j}^j,$$

$$\frac{\partial \log p_{\phi_y^j}^j}{\partial f_{c_l}^l} = \sum_{i=1}^{k} g_{i\phi_y^j}^j g_{il}^l \frac{p_i}{p_{\phi_y^j}^j} - p_{c_l}^l, \quad l \neq j,$$

$$\frac{\partial \log p_w}{\partial w_i} = -\lambda \sum_{j=1}^{m} \sum_{c_j=1}^{k_j} g_{ic_j}^j (w_i - w_{c_j}^j),$$

$$\frac{\partial \log p_w}{\partial w_{c_j}^j} = -\lambda \sum_{i=1}^{k} g_{ic_j}^j (w_{c_j}^j - w_i),$$

where $\phi_y^j = c_y$ denotes the non-zero element of i-th row of $G_j$, that is, $g_{ic_j}^j = 1$; $p_i$ and $p_{\phi_y^j}^j$ are the marginal probability derived from claim 7; $w_i$ is i-th column of W; $w_{c_j}^j$ is $c_j$-column of $W_j$.

10. The method of claim 1, wherein the objects comprises a finished good, further comprising modeling label structures between fine-grained labels and their ingredients in a bipartite graph.

11. The method of claim 10 wherein the finished good comprises food.

12. The method of claim 1, comprising classifying food type and restaurant source.

13. The method of claim 1, comprising modeling a bi-partite graph structure in a conditional random field (CRF) and optimizing lower-level features and high-level connections in the CNN.

14. The method of claim 1, for a training data X and a graph label defined by $\{G_j\}_{j=1}^m$, comprising determining a last layer of the CNN with BGL to minimize a joint negative log-likelihood with proper regularization over weights:

$$\min_{W, \{W_j\}_j} \sum_{(x,y) \in \chi} \left( -\log p_y - \sum_{j=1}^{m} \log p_{\phi_y^j}^j \right) - \log p_w,$$

see claim 10 for the definition of each component.

15. The method of claim 1, comprising generating bipartite-graph labels for fine-grained object recognition in the CNNs and modeling a bi-partite graph structure in a conditional random fields (CRF) and optimizing low-level features and high-level connections in the CNN.

16. A system to perform deep learning and classifying images of objects, comprising:
   a processor;
   an image sensor coupled to the processor, the image sensor capturing images of objects;
   a multi-class convolutional neural network (CNN) having a softmax layer and a final fully connected layer to explicitly model bipartite-graph labels (BGLs); and
   a computer readable module coupled to the CNN for:
      receiving a set of training images of objects;
      producing k fine-grained labels of the objects;
      providing the labeled set of training images to the multi-class convolutional neural network (CNN) having a softmax layer and a final fully connected layer to explicitly model bipartite-graph labels (BGLs), and for m types of coarse classes, where each coarse type j (for j=1, ..., m) contains $k_j$ coarse classes, modeling BGL relations of the k fine-grained classes with the coarse classes as m bipartite graphs grouped in a star-like structure;
   optimizing the CNN with global back-propagation; and
   classifying input images of objects into fined-grained classes using the optimized CNN.

17. The system of claim 16, comprising code for modeling a relation between the fine-grained labels and attributes in a hierarchical manner.

18. The system of claim 16, comprising code for applying the BGLs to jointly model fine-grained classes with pre-defined coarse classes.

19. The system of claim 16, comprising code for:
   generating scores $f = W^T x \in \mathbb{R}^k$ for k fine-grained classes;
   generating scores $f_j = W_j^T x \in \mathbb{R}^{k_j}$ for $k_j$ coarse classes of type j;
   augmenting a last fully-connected layer W with m additional variables, $\{W_j\}_{j=1}^m$ and
   with an input image x of i-th fine-gained class, modeling a BGL joint probability with m coarse labels $\{c_j\}_{j=1}^m$ as, $$P(i, \{c_j\}_j \mid x, W, \{W_j\}_j) = \frac{1}{z} e^{f_i} \prod_{j=1}^{m} g_{ic_j}^j e^{f_{c_j}^j}.$$

* * * * *